Figure 1:
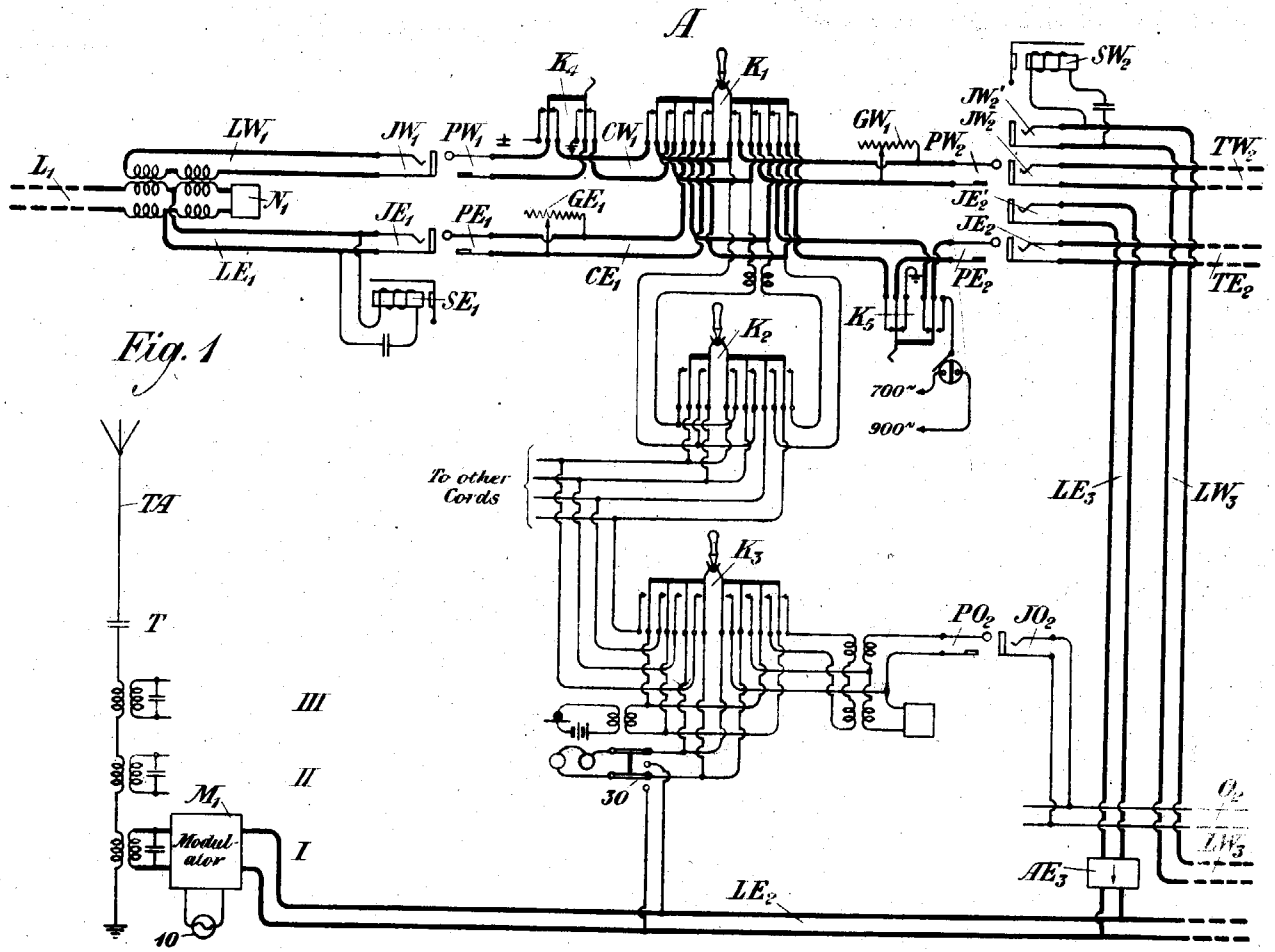

July 20, 1926.

Re. 16,385

R. BOWN ET AL

RADIO WIRE CONNECTING CIRCUITS

Original Filed April 26, 1921 4 Sheets-Sheet 1

INVENTORS
R. Bown & E. L. Nelson
BY
G. E. Folk
ATTORNEY

July 20, 1926. Re. 16,385

R. BOWN ET AL

RADIO WIRE CONNECTING CIRCUITS

Original Filed April 26, 1921 4 Sheets-Sheet 2

INVENTORS

R. Bown & E. L. Nelson

BY

ATTORNEY

July 20, 1926.

Re. 16,385

R. BOWN ET AL

RADIO WIRE CONNECTING CIRCUITS

Original Filed April 26, 1921 4 Sheets-Sheet 3

INVENTORS
R. Bown & E. L. Nelson
BY
ATTORNEY

July 20, 1926.

Re. 16,385

R. BOWN ET AL

RADIO WIRE CONNECTING CIRCUITS

Original Filed April 26, 1921 4 Sheets-Sheet 4

INVENTORS
R. Bown & E. L. Nelson
BY
G. E. Folk
ATTORNEY

Reissued July 20, 1926. Re. 16,385

UNITED STATES PATENT OFFICE.

RALPH BOWN, OF MAPLEWOOD, AND EDWARD L. NELSON, OF EAST ORANGE, NEW JERSEY, ASSIGNORS TO AMERICAN TELEPHONE AND TELEGRAPH COMPANY, A CORPORATION OF NEW YORK.

RADIO WIRE CONNECTING CIRCUITS.

Original No. 1,472,239, dated October 30, 1923, Serial No. 464,668, filed April 26, 1921. Application for reissue filed June 4, 1926. Serial No. 113,809.

This invention relates to connecting circuits and more particularly to connecting or link circuit for establishing connections between wire lines and radio systems.

Radio systems, as now developed, and particularly radio telephone systems, involve a transmitting station and a receiving station, usually located some distance apart, as for example, a mile or so. In order to reduce reaction of the radio transmitter upon the radio receiver, the transmitting station may be provided with a plurality of channels for transmitting to each of several distant receiving stations and the receiving station may likewise be provided with a corresponding number of receiving channels for simultaneously receiving messages from said distant stations. In order that the communication facilities provided by such a radio system may be extended over wire telephone or telegraph circuits, it is desirable that some arrangement be provided for interconnecting any long distance telephone circuits, for example, with any one of a number of corresponding transmitting and receiving channels of the radio system.

There are certain factors which make the operation of a radio telephone system distinctly different in some important aspects from similar operation of wire or carrier circuits. The radio receiving station and the radio transmitting station, although located a short distance apart, must be brought to a common point with the toll line terminal so that they may be properly connected for a through circuit from wire to radio. It is further desirable that this condition be duplicated at both the transmitting and receiving station of the radio system that is to say, duplicate arrangements should be installed at the two stations, which will allow the operation from either station of any or all circuits independently.

Each radio operator must be able to perform a number of different operations. For example, he must be able either to listen or to talk and listen simultaneously or independently on any and all radio channels. He must be able to monitor a call which has been set up between radio and wire without interrupting; also, he must be able to talk or listen either way on such a call. Furthermore, the operator should be able before making the final through connections on a call, to adjust the gains on either the transmitting or receiving side of the circuit so that a proper communication will result. Arrangements are, of course, also necessary for signaling over the toll wire circuit or for signaling the distant radio stations. It should be possible for any call to be monitored from the non-operating station; that is to say, if operation is being carried on from the receiving station board, it should, at the same time, be possible to monitor all connections from the transmitting station board as well. Finally, provision must be made for the operator to cut over quickly and readily to an order wire connecting the transmitting and receiving station of the radio unit.

In accordance with the present invention, connecting or link circuits are provided and so organized as to interconnect wire lines with radio channels, in such a manner as to satisfy the foregoing requirements. As it is obviously necessary that the two-wire toll line which is brought up to the radio station, must be split into a four-wire circuit before connection with the radio transmitting and receiving channels, there are two possible places in the circuit where the necessary switching and operating arrangements may be introduced. These are in the two-wire line or in the four-wire part of the circuit. In accordance with the present invention, arrangements are provided for performing the switching operations in accordance with either of these methods.

Figure 2:
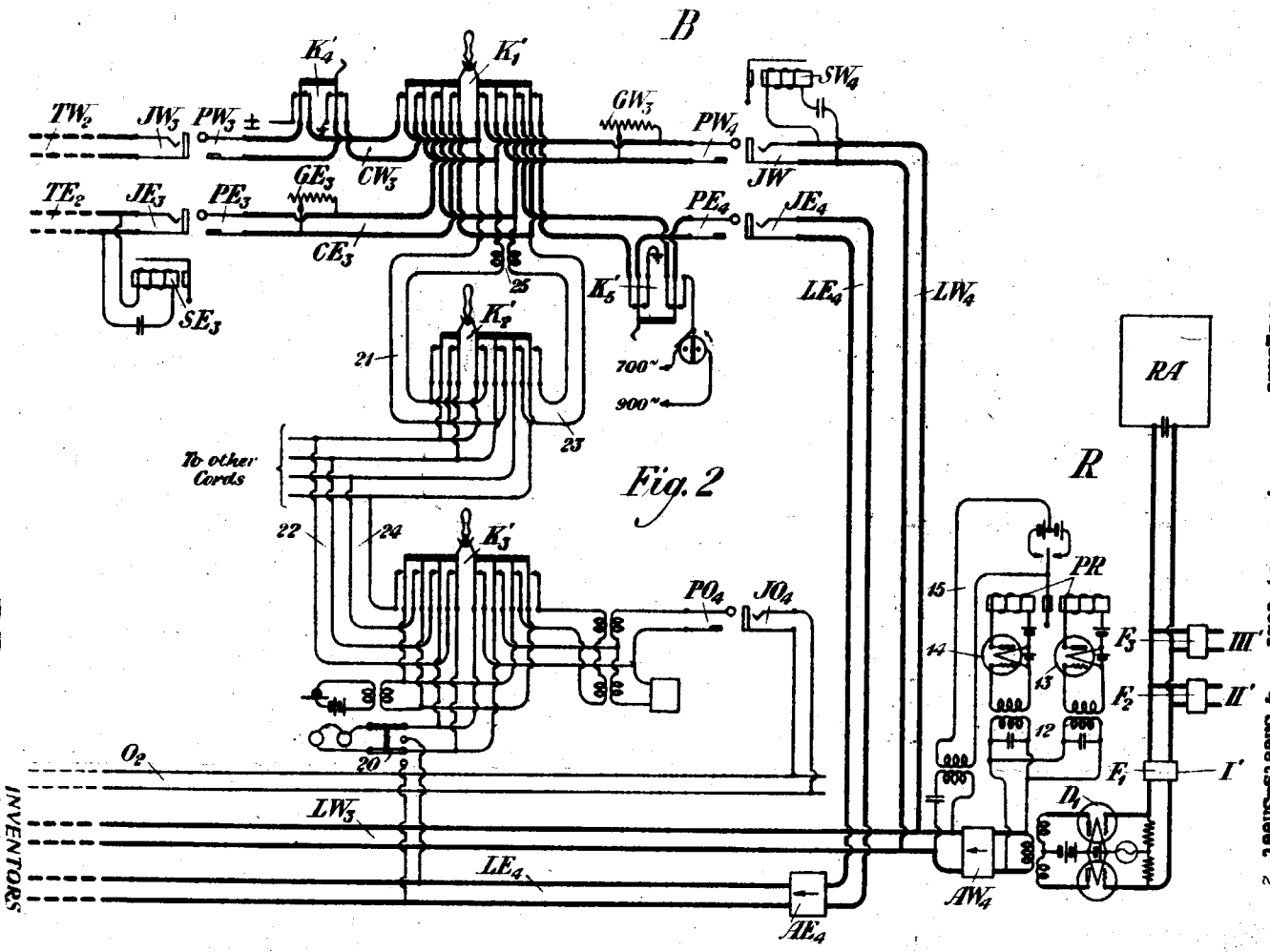
Figure 3:
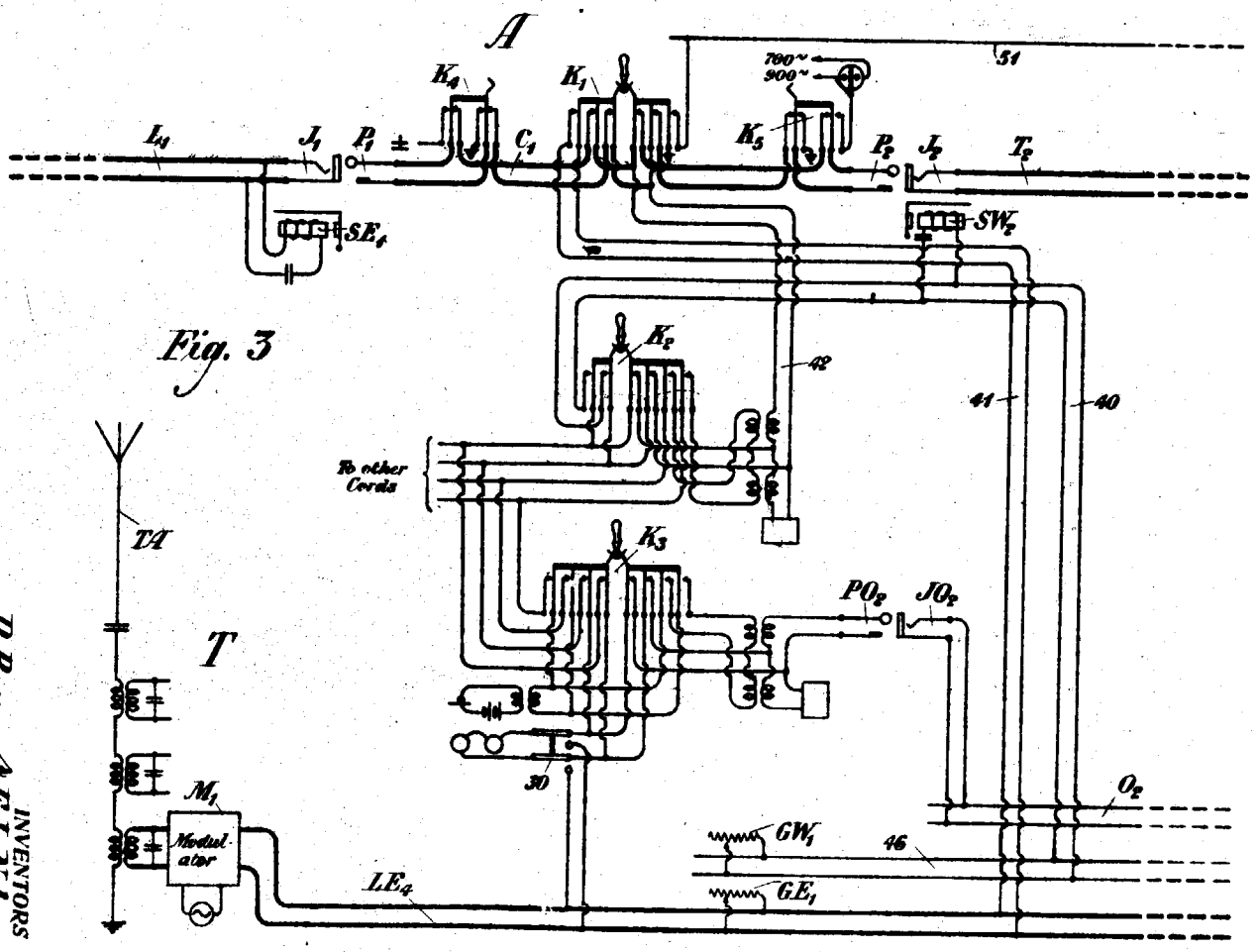
Figure 4:
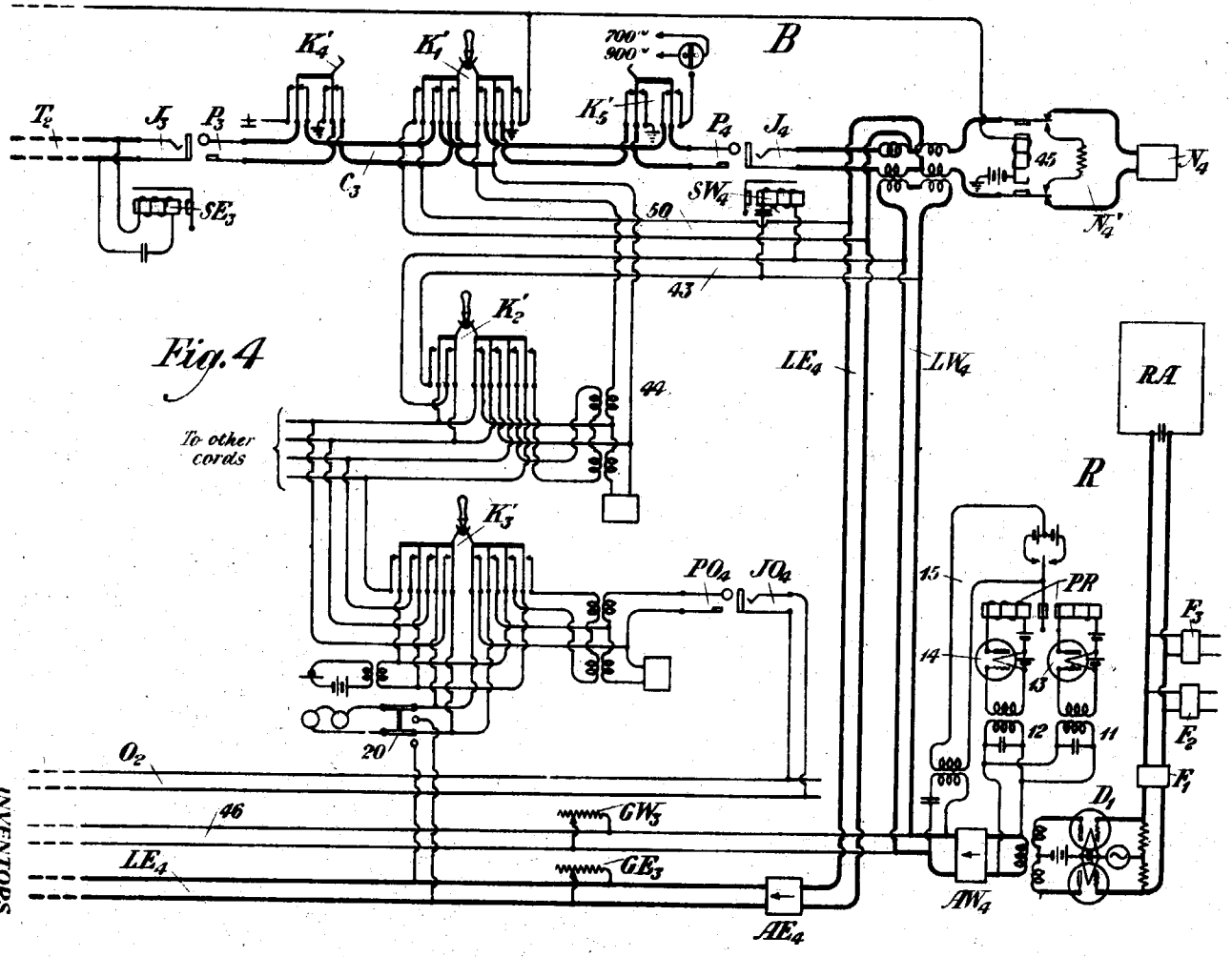

The invention may now be more fully understood from the following description, when read in connection with the accompanying drawing, Figs. 1 and 2, of which, illustrate switching circuits at the radio transmitter and radio receiver respectively of a radio system, for inter-connecting the system with wire lines, the switching arrangement being associated with the four-wire part of the circuit; and Figs. 3 and 4 illustrate a similar arrangement in which the switching devices are provided in the two-wire part of the circuit.

Referring to Figs. 1 and 2, Fig. 1 illustrates the apparatus associated with the radio transmitter located at station A, and Fig. 2 illustrates the apparatus at a corresponding receiving station B located a short distance away, the two stations cooperating to simultaneously transmit to and receive from distant radio stations. $L_1$ designates a toll line terminating at the station A, at which point it is branched through the usual hybrid coil into a circuit $LE_1$ leading to the radio transmitter and a circuit $LW_1$ leading from the radio receiver, the circuits $LE_1$ and $LW_1$ terminating in jacks $JE_1$ and $JW_1$ respectively. The line $L_1$ is balanced in a well known manner by means of networks $N_1$. Associated with jack $JE_1$ is a drop $SE_1$ or other form of signal responsive device, to indicate the transmission of ringing current over the toll line $L_1$. The cord circuit comprising conductors $CW_1$ and $CE_1$ is provided at station A for controlling the establishment of connections between the circuits $LW_1$ and $LE_1$ and the radio transmitter T and receiver R. For this purpose the conductors $CW_1$ terminate in the plugs $PW_1$ and $PW_2$ while conductors $CE_1$ terminate in plugs $PE_1$ and $PE_2$. When it is desired to establish connections to the radio transmitter and receiver directly at station A, the plugs $PW_2$ and $PE_2$ may be inserted into jacks $JW_2'$ and $JE_2'$ which are connected to circuits $LW_3$ and $LE_3$ respectively, the latter being connected by means of conductors $LE_2$ to the local transmitter T and the former extending over a circuit leading to the receiver R at the receiving station B.

The radio transmitter T is merely conventionally indicated and comprises a transmitting antenna TA having associated therewith channels I, II and III for multiplex transmission. Only the apparatus associated with the channel I is indicated and this apparatus comprises a modulator $M_1$ of any well known character as, for example, a vacuum tube modulator—said modulator being supplied with carrier current of radio frequency from a source 10. The telephone or other signaling currents are applied to the modulator of the channel I over the circuit $LE_2$.

When the establishment of connections between the wire line and the radio system is to be controlled from the receiving station B, the cord circuit illustrated in Fig. 1 may be connected to jacks $JW_2$ and $JE_2$, which are connected to trunks $TW_2$ and $TE_2$ leading from station A to station B. In this instance the cord functions merely as a patching cord to extend the circuits $LW_1$ and $LE_1$ to station B. The drop $SW_2$ may be associated with the jack $JW_2$, to indicate to the operator at station A that a distant radio station desires to be connected to the wire line.

The cord circuit is provided with three switching keys, $K_1$, $K_2$ and $K_3$ all controlling the monitoring, listening and talking operations, and with ringing keys $K_4$ and $K_5$, the former being arranged to transmit ringing current to the wire line and the latter to transmit a ringing signal to the radio transmitter, in order to call a distant radio station. For the latter purpose the key $K_5$ is arranged to alternately apply ringing current of two frequencies to the plug $PE_2$. These frequencies are preferably within the voice range, as for example, 700 cycles and 900 cycles, and the ringing apparatus of the radio station is so arranged, as will be later described, that it will respond when both of these frequencies are applied alternately, but will not respond to either frequency alone.

The keys $K_1$, $K_2$ and $K_3$, each have three positions in which they may be locked in any well known manner. The springs of the key $K_1$ are so arranged that with the key lever in its normal position, the springs on either side of the key lever will be closed. When the insulated element of the key lever is shifted to the left, the springs on the left-hand side will remain closed, but those on the right-hand side will be open, so that the listening and monitoring apparatus will be disconnected from the radio side of the system and will be connected to the wire side of the system exclusively. When the key lever is shifted in the opposite position, the right-hand springs will remain closed and the left-hand springs will be permitted to open, so that the operator's apparatus will be connected to the radio side of the system exclusively. The keys $K_2$ and $K_3$ are similar in construction to key $K_1$ except that in the neutral position of the key lever all of the springs are open and when the insulating element is shifted to the right, for example, all of the springs to the right will be closed, and when shifted to the left only the springs to the left will be closed. The key $K_3$ functions to connect the operator's talking and listening set either to a plug $PO_2$ which may be connected to an order wire $O_2$ through a jack $JO_2$, or to the cord circuit through key $K_2$. When the key $K_3$ is adjusted to connect the operator's set with the cord set, the key $K_2$ will determine whether the operator's receiver will be connected to the circuit alone for monitoring purposes or whether both transmitter and receiver will be connected to the circuit for talking and listening.

At the station B the trunks $TW_2$ and $TE_2$ terminate in jack $JW_3$ and $JE_3$ and a drop $SE_3$ may be associated with the jack $JE_3$ to respond to a ringing signal from the line $L_1$. A cord circuit having conductors $CW_3$ and $CE_3$ is arranged to extend the connection from the circuits $TW_2$ and $TE_2$ to the circuits $LW_4$ and $LE_4$ leading to the radio receiver and radio transmitter respectively. The cord circuit shown at station B is identical in arrangement with that shown in station A, and need not be further described. This cord circuit enables the operator at station B to control the establishment of connections between the wire line and the radio system. When the connections are to be controlled from station A the cord circuit may be used to enable the operator at station B to monitor a connection established at station A, by inserting the plugs $PW_4$, and $PE_4$ in the jacks $JW_4$ and $JE_4$. The drop $SW_4$ may be associated with pack $JW_4$, for responding to ringing signals incoming from the radio system and the operator's set at station B may be connected to the order wire $O_2$ through plug $PO_4$ and jack $JO_4$ when the key $K_6'$ is operated to shift the insulating element to the right.

The radio receiving apparatus comprises an antenna RA, with which may be associated a plurality of receiving channels I', II', and III'. The channels include suitable filtering apparatus $F_1$, $F_2$ and $F_3$. The receiving apparatus associated with the channel I' alone is illustrated. This apparatus includes a demodulator or detector $D_1$, which may be for example, of the balanced vacuum tube type, said demodulator being connected to the circuits $LW_3$ and $LW_4$ leading to the switchboards at stations A and B respectively. If desired, an amplifier $AW_4$ may be provided in the output circuit of the demodulator $D_1$. The ringing responsive apparatus associated with the radio receiver comprises two tuned circuits 11 and 12, connected to the output side of the demodulator, these tuned circuits being selective of the detected ringing frequencies of, for example, 700 and 900 cycles, respectively. Vacuum tube detectors 13 and 14 are associated with the two tuned circuits and these detectors control the individual windings of a polar relay PR. When the two frequencies of, for example, 700 cycles and 900 cycles, are alternately received at some low frequency rate of interruption as, for example, 16 interruptions per second, the winding of relay PR will be alternately energized to shift the armature to the right and left at a corresponding low frequency rate, thereby shifting the battery connections of a local circuit 15 so that a low frequency alternating ringing circuit of 16 cycles per second will be transmitted to the circuits $LW_3$ and $LW_4$ to operate the drops $SW_2$ and $SW_4$ at stations A and B respectively.

Further details of the apparatus may now be understood from description of the operation which is as follows:

Assuming that the control of the establishment of a connection between the wire system and the radio system, is to be from station B, the cord circuit of Fig. 1 will be used as a patching circuit by inserting the plugs $PW_1$ and $PE_1$ into jacks $JW_1$ and $JE_1$, and by inserting the plugs $PW_2$ and $PE_2$ in jacks $JW_2$ and $JE_2$. The keys $K_1$ and $K_2$ will be in their normal positions and the gain controlling devices $GW_1$ and $GE_1$ will be open so that the cord functions as a simple patching cord. If a distant radio station signal is to be connected over line $L_1$ a carrier frequency will be received by the antenna RA from the distant station, said carrier frequency being alternately modulated at a rate of 16 cycles per second, for example, in accordance with ringing frequencies of said 700 and 900 cycles. The detector $D_1$ functions to detect from the carrier frequency the frequencies of 700 to 900 cycles respectively, and these frequencies are selected by the circuits 11 and 12 to cause the armature of the relay PR to vibrate at a rate of 16 cycles per second, thereby impressing a ringing signal upon the conductors $LW_3$ and $LW_4$ to actuate the drops $SW_2$ and $SW_4$. As the operator at station B is to handle the call, the operator at station A will ignore the drop and the operator at station B will answer the call by inserting the plugs $PW_4$ and $PE_4$ in the jacks $JW_4$ and $JE_4$.

The operator will throw the key $K_3'$ to open the lefthand springs thereof and the key $K_2'$ will be shifted to close the righthand springs. If desired, the operator may also shift the key $K_1'$ to open its lefthand springs. The operator's transmitter and receiver will now be connected to the radio side of the system, the transmitter being connected to the circuit $LE_4$ and the receiver being connected to the circuit $LW_4$. The operator will therefore receive the detected voice message transmitted from the distant radio station, communicating with the calling station by means of her transmitter which is connected to the circuit $LE_4$. The operator is enabled to speak to the distant calling station by transmitting the voice current over the circuit $LE_4$ and over the circuit $LE_2$ to the modulator $M_1$ so that the carrier frequency supplied by the modulator $M_1$ will be radiated by the antenna TA as modulated by the voice currents incoming from the circuit $L_2$.

The operator, having determined that the call is for the line $L_1$, may first adjust the gain due to the amplifier $AW_4$ by means of the gain adjusting device $GW_3$, this gain adjusting device being connected between the amplifier $AW_4$ and the operator's receiver. The operator may also adjust the gain of the amplifier $AE_4$ in the circuit leading to the radio transmitter, by adjusting the gain controlling device $JE_3$, at the same time throwing the switch 20 to its lower position in order to shift the connection of the operator's receiver from the key $K_3'$ to the transmitting circuit $LE_4$. It will be seen that the operator's receiver is now connected to the output side of the amplifier $AE_4$ and the gain controlling device will adjust the input current, the operator being enabled to determine when the adjustment is right by listening on the output side of the amplifier. The operator will then restore the switch 20 and shift the key $K_1'$ to open the righthand springs, thereby disconnecting her set from the radio side of the system and connecting it to the wire side. The plugs $PW_3$ and $PE_3$ will then be inserted in the jacks $JW_3$ and $JE_3$ and the ringing key $K_4'$ will be actuated to transmit ringing current over the circuit $TW_2$ through the cord conductor $CW_1$ and over the circuit $LW_1$ to the toll line $L_1$.

Having signaled the distance toll operator, the radio operator is enabled to communicate with the toll operator to pass information as to the desired connection. In conversing with the toll operator the radio operator's transmitter will be connected to the circuit $TE_2$ and the receiver to the circuit $TW_2$ so that the transmission over these circuits will take place in directions opposite to the normal direction of transmission when the complete connection between the radio system and the wire system is set up.

The distant toll operator, having obtained the desired subscriber, the key $K_1'$ will be restored to its neutral position and the conductors of the cord circuit will be extended through from the wire part of the system to the radio part of the system. The called subscriber can now communicate with the calling radio station over a circuit as follows:

From the line $L_1$ over the circuit $LE_1$, conductors $CE_1$, trunk $TE_2$, conductors $CE_3$, conductors $LE_4$ including the repeater $AE_4$, conductors $LE_2$, to the modulator $M_1$ and thence by radiation of the antenna TA to the distant station.

Transmission in the opposite direction from the calling radio station to the called subscriber takes place as follows:

The received radio oscillations are impressed upon the receiving antenna RA, passed through the filter $F_1$, detected by detector $D_1$, amplified by amplifier $AW_4$ and then transmitted over the circuit $LW_4$, conductors $CW_3$, trunk $TW_2$, conductors $CW_1$ and circuit $LW_1$ to the line $L_1$.

During the conversation the operator may listen in on the transmission from radio to wire without disturbing the connection, by throwing the key $K_2'$ to close the lefthand springs thereof, the key $K_3'$ being, of course, in position to connect the operator's set with the various cords. Under these circumstances, the talking currents incoming from the circuit $LW_4$ to the conductors $CW_3$ will pass into the circuit 21 over the lefthand contacts of the key $K_2'$ over the circuit 22 and inner lefthand contacts of the key $K_3'$ to the receiver. The operator may also listen in on the conversation transmitted both ways by throwing the key $K_2'$ to its talking and listening position, so that the righthand springs of the key are closed. Under these circumstances the circuit 21 is connected to the circuit 22 over the inner righthand contacts of the key $K_2'$ and the connection is extended from the conductors $CE_3$ over circuit 23, outer righthand contacts of key $K_2'$ over the circuit 24, outer lefthand contact of the key $K_3'$ to the operator's transmitter. The voice currents passing from the trunk $TE_2$ to the radio transmitter will flow into the circuit 23 and will be heard by the operator through the transfromer 25 which affords a side tone connection between the operator's transmitter and receiver.

The operation when a subscriber desires to be connected over the toll line to a distant radio station will be somewhat similar. In this case ringing current will be transmitted from the toll line $L_1$ over the circuit $LE_1$ conductors $CE_1$ and trunk $TE_2$, thereby actuating the drops $SE_1$ and $SE_3$. The operator at station B in response to the actuation of the drop $SE_3$ will plug into jacks $JW_3$ and $JE_3$ and shift the key $K_1'$ to connect her set to the wire side of the cord, the key $K_2'$ being in talking and listening position. Having ascertained the connection desired, the operator will insert the plugs $PW_4$ and $PE_4$ into the jacks $JW_4$ and $JE_4$, and then shift the key $K_1'$ to the opposite position and actuate the ringing key $K_5$. This will result in alternately applying to the circuit $LE_4$ currents of 700 cycles and 900 cycles, respectively. These currents will be transmitted through the amplifier $AE_4$ and over the circuit $LE_2$ to the modulator $M_1$. The carrier frequency from the source 10 will be modulated accordingly and radiated to the distant station where it may actuate the ringing apparatus similar to that illustrated in connection with the radio receiver at station B.

When the distant operator answers the call, the radio operator at station B may communicate with such operator at the same time adjusting the receiving gain by means of the transmission adjusting device $GW_3$. As soon as the distant radio operator is ready to receive the call, the key $K_1'$ can be restored to normal position, thereby connecting the radio circuit through to the wire circuit. The gain of the amplifier $AE_4$ in the transmitting circuit may be adjusted as previously described, by shifting the switch 20 to connect the receiver to the circuit $LE_4$, and by adjusting the transmission device $GE_3$. The monitoring operation during the connection will be as previously described.

During any of these connections, the operator at station A will be enabled to monitor in exactly the same way as at station B, by suitable manipulation of the cord circuit keys and the operators at the two stations may communicate with each other at any time by shifting their keys $K_3$ and $K_3'$ to close their righthand springs, thereby connecting the operator's sets to the plugs $PO_4$ and $PO_2$ respectively. These plugs will be inserted in the jacks $JO_4$ and $JO_2$ respectively, associated with opposite ends of order wire $O_2$, so that conversation may now proceed over the order wire.

In the operation previously described it has been assumed that the operator at the receiving station B will be in charge of the establishment of connections. It is equally possible, however, to establish the connections at station A. In this case the trunks $TW_2$, $TE_2$, the cord circuits $CW_3$ and $CE_3$ at station B and the circuits $LW_4$ and $LE_4$ need not be used. The operator at station A establishes the connection by inserting the plugs $PW_2$ and $PE_2$ in the jacks $JW_2'$ and $JE_2'$. The ringing signal from a distant radio station will operate the drops $SW_2$ and $SW_4$ as previously described. Where the operator at station A is to establish the connection from radio to wire in response to a call from a distant radio station, the operator at station A will insert the plugs in the jacks as described and by proper manipulation of the keys $K_1$, $K_2$ and $K_3$, the operator will be able to communicate with the distant radio operator. The message currents transmitted by the operator at station A will pass over the circuits $LE_3$ through an amplifier $AE_3$ and over the circuit $LE_2$ to the radio transmitter. In transmitting from the distant station to the operator's receiver, the detected voice currents in the output circuit of detector $D_1$ at station B will be amplified by amplifier $AW_4$ and transmitted over the circuit $LW_3$ and over the conductors $CW_1$ of the cord circuit to the operator's receiver. The operation of ringing the toll operator will be similar to that described in connection with that of setting up a call at station B and need not be further described. As the cord circuit at station A is identical with that at station B, the monitoring, talking and listening operations of the operator will be the same as those already discussed. The adjustment of the gain of the repeater $AW_4$ can be determined by setting the transmission controlling element $GW_1$ of the upper pair of conductors of the cord circuit and the gain of the amplifier $AE_3$ may be adjusted by means of the element $GE_1$, the operator's receiver being switched by means of the switch 30 into connection with the circuit $LE_3$. The manner in which a call incoming from the toll line $L_1$ is switched to the radio apparatus, will be obvious without further description, the connection being established by inserting the lefthand plugs of the cord circuit at station A into the jacks connected with the toll line, and by inserting the plugs $PW_2$ and $PE_2$ into the jacks $JW_2'$ and $JE_2'$.

The method of operation just described prevents the operator at station B from taking any part in the establishment of a connection. The operator at station B may, however, monitor on a receiving circuit, that is, on transmission from the radio receiver to the toll line, by inserting plugs $PW_4$ and $PE_4$ into the jacks $JW_4$ and $JE_4$. The keys $K_1'$, $K_2'$ and $K_3'$ being thrown to the proper positions for monitoring, this will connect the operator's receiver to the circuit $LW_4$, thereby permitting the operator to listen in on the received transmission.

In order to enable the operator at station B to monitor, talk and listen in the same manner as the operator at station A, when the connection is established through the cord circuit at station A, a slightly different method of operation may be employed. In order to obtain this result, the cord circuit at station B may be used as a patching cord by inserting the plugs $PW_3$ and $PE_3$ into the trunk jacks, and the plugs $PW_4$ and $PE_4$ into the jacks $JW_4$ and $JE_4$. The key $K_1'$ should be in neutral position when the cord is to be used for patching purposes. With the circuit thus connected the operator at station A in response to a radio call actuating the drop $SW_2$ or in response to a toll call operating the drop $SE_1$, will complete the connection by inserting the plugs $PW_1$ and $PE_1$ in the jacks $JW_1$ and $JE_1$ as before, and by inserting the plugs $PW_2$ and $PE_2$ into the jacks $JW_2$ and $JE_2$. Transmission will now take place, both ways, through the cord circuit at both positions, and either operator may monitor or may talk and listen. When connections are to be established in this manner, the gain controlling device $GW_3$ and $GE_3$ at station B should be open so that the adjustment of the gain will be under the control of the operator at station A.

It will be noted that the cord circuits are so arranged that an operator may monitor on any number of connections simultaneously. This may be done by throwing the key $K_3$ which is common to all of the cords, to such a position as to close its lefthand springs, the keys $K_2$ individual to each of the cords being likewise thrown to close their lefthand springs. When the operator desires to use her set for establishing connections, however, the keys $K_2$ of all other cord circuits than the one used in the establishing connection, should be in neutral position in order to prevent the conversation between the operator and the calling parties from being transmitted to establish connections. Monitoring on all connections simultaneously should therefore be taken care of by the operator at station B when the operator at station A is establishing connections, or vice versa.

The arrangement illustrated in Figs. 1 and 2 involves arrangement in which the toll line is split into a four-wire circuit, at the point where it is brought up to the first position of the radio system, and the toll circuit is therefore extended through the two positions at the transmitter and receiver respectively as a four-wire circuit.

A modified arrangement is illustrated in Figs. 3 and 4, in which the toll circuit is carried through the two stations as a two-wire circuit and at the second of the two stations is split into a four-wire connection, one pair leading to the radio transmitter and the other to the radio receiver.

Referring to Figs. 3 and 4, $L_1$ designates a toll line terminating at the transmitting station A in jack $J_1$. A cord circuit $C_1$ is provided at this station, terminating into plugs $P_1$ and $P_2$ for use in extending the toll line to station B. A trunk $T_2$ extends between stations A and B, terminating at the former in a jack $J_2$ and at the latter in a jack $J_3$. At station B a similar cord circuit $C_3$ terminating in plugs $P_3$ and $P_4$ is provided for extending the trunk connection to the point at which the two-wire circuit is split into a four-wire circuit. A jack $J_4$ is provided at this point and the two-wire circuit terminates in the usual hybrid coil arrangement whereby the circuit may be split into two branches, one branch $LE_4$ leading to the radio transmitter and the other branch $LW_4$ leading to the radio receiver. The balancing network $N_4$ is provided for balancing the two-wire circuit.

Here again the establishment of a connection may be under the control of the operator either at station A or B. If the connection is to be established at station A, the cord circuit $C_3$ at station B will be used as a patching cord; if the connection is to be established at station B the cord circuit at station A will be used as a patching cord. Both cord circuits are identical and are provided with controlling keys similar to those of the cord circuits shown in Figs. 1 and 2. The keys $K_3$ and $K_3'$ and their connections, are identical to the corresponding keys in Figs. 1 and 2. The keys $K_1$ and $K_2$ are also similar in construction to the corresponding keys in Figs. 1 and 2, and perform somewhat the similar functions, but the circuit connections are slightly different. The key $K_2$, for example, when its lefthand springs are closed, establishes a monitoring circuit, but the monitoring circuit does not extend to the conductors of the cord but extends over an independent connection 40 to a trunk connection $LW_3$ leading from the station A to the output side of the amplifier $AW_4$ of the radio receiver at station B. In the talking and listening position of the key $K_2$ on the other hand, the operator's transmitting and receiving circuits are extended as four-wire circuits from the righthand contacts of the key $K_2$ and are then merged by means of a hybrid coil arrangement into a two-wire circuit 42 bridged across the talking conductors of the cord $C_1$. The connections of the key $K_2'$ at station B are similar, the monitoring connections being established over conductors 43 leading to circuit $LW_4$ on the output side of the amplifier $AW_4$, while in the talking and listening position of the key the transmitter and receiver of the operator are connected through a four-wire circuit, to a hybrid coil merging into a connection 44 bridged across the talking conductors of cord $C_3$.

The key $K_1$ is arranged so that when in neutral position the two ends of the cord will be connected together with the talking and listening connection 42 bridged across the cord. The four inner contacts of the key are normally closed in the neutral position and the two outer contacts are normally open in this position. When the key is thrown to shift its insulating element to the left, the normally closed springs at the right are open and the talking and listening connection extends toward the toll line exclusively and is disconnected from the radio part of the system. The extreme lefthand contact of the key is also closed to short-circuit the circuit $LE_4$ over the conductors 41 to prevent any singing in the radio system due to the unbalancing of the hybrid coil when the line side of the balancing circuit is open. When the key is shifted to the opposite position, the lefthand normally closed contacts are open and the talking and listening connections are to the radio side of the system exclusively. The extreme righthand contact of the key is also closed to complete a circuit through the relay 45 which functions to disconnect the normal balancing network $N_4$ and substitute an auxiliary network $N_4'$ so that the hybrid coil to take care of the balance under the changed impedance conditions due to the fact that the impedance of the operator's set is different from that of the toll line. The key $K_1'$ is similar to the key $K_1$ its extreme lefthand contact controlling a short circuit over the circuit $LE_4$ leading to the radio transmitter and its extreme righthand contact controlling the relay 45 to change the net work so as to balance the operator's set.

The ringing keys $K_4$, $K_4'$, $K_5$ and $K_5'$ are similar to those used in ordinary cord circuits except that the keys $K_3$ and $K_3'$ are arranged to alternately connect two different frequencies to the radio side of the system as described in connection with the corresponding keys of Figs. 1 and 2.

The radio transmitter T and the radio receiver R are similar to the corresponding arrangements illustrated in Figs. 1 and 2, and need not be described.

The gain controlling devices are not associated with two-wire cord circuits in Figs. 3 and 4, but are included in the four-wire part of the circuit, for example, the gain controlling device $GE_1$ and $GE_3$ are bridged across circuit $LE_4$ leading to the radio transmitter at stations A and B respectively, and the gain controlling devices $GW_1$ and $GW_3$ are bridged across a bridge circuit 46 leading from the conductors $LW_4$ associating the radio receiver with the two-wire part of the circuit.

Further details of the apparatus may now be understood from the description of the operation which is as follows:

Assuming that the completion of connections to the radio system is to be controlled at station B, the cord circuit $C_1$ at station A will be plugged into the jacks $J_1$ and $J_2$ to serve as a patching cord for extending the toll line $L_1$ over the trunk $T_2$ where it terminates in the jack $J_3$. In response to a ringing signal the drops $SE_1$ and $SE_3$ will be actuated and the operator at station B, observing the actuation of the drop $SE_3$ will insert the plug $P_3$ of the cord $C_3$ into the jack $J_3$ and throw the key $K_1'$ so that its insulating element is moved to the left. This closes the short circuit connection 50 across the conductors $LE_4$ and prevents the singing of the system from the radio transmitter to the radio receiver due to unbalance while the cord circuit is held open. By throwing the key $K_2'$ to close its righthand springs and the key $K_3'$ to close its lefthand springs, the operator's set is connected over conductors 44 to the toll circuit, to the exclusion of the radio part of the system and the operator is enabled to converse with the calling operator or subscriber.

Upon obtaining the desired information as to the call which it will be assumed is to be extended over the radio channel illustrated, the operator inserts the plug $P_4$ in the jack $J_4$ and throws the key $K_1'$ in the opposite direction to connect her set to the radio part of the system exclusively. The operator may then actuate the key $K_5'$ to transmit ringing current over the conductors $LE_4$ to the radio transmitter. When the distant radio station answers, the key $K_1'$ may be thrown to neutral position and the conversation may be carried on over the wire circuit and over the radio system. Before finally completing the connection the operator adjusts the gains of the amplifiers $AE_4$ and $EW_4$. In order to adjust the gain of the amplifier $AW_4$ the key $K_2'$ may be thrown to close its lefthand springs, thereby connecting the operator's receiver over circuit 43 to the output side of the amplifier $AW_4$. The gain controlling device $GW_3$ which is bridged across the output circuit of the amplifier, may then be adjusted so that the desired gain is obtained as determined by the sound in the operator's receiver. The operator may then throw the switch 20 to its lower position thus bridging the receiver across the circuit $LE_4$ on the output side of the amplifier $AE_4$. The gain of this amplifier may be adjusted by means of the adjusting device $GE_3$.

During the continuance of the connection the operator may monitor on the circuit leading to the radio receiver by maintaining the key $K_2'$ in the position in which the lefthand springs are closed. If the key is thrown to the opposite position, the operator will be enabled to listen and talk at any time by reason of the fact that the operator's set is bridged across the cord circuit through conductors 44. By throwing the key $K_3'$ to close its lefthand springs, the operator's set may be connected to the order wire $O_2$ so that the operators at stations A and B may communicate with each other.

A call from radio to wire is handled in a somewhat similar manner. A ringing signal incoming from a distant radio station operates the apparatus in a manner similar to that described in connection with Fig. 2, and transmits a ringing current to conductors $LW_4$ and $LW_3$, thereby actuating the drops $SW_2$ and $SW_4$. The operator at station B then plugs into the jack $J_4$ and throws the key $K_1'$ to shift its insulating element to the right. This connects the operator's set to the radio side of the system exclusively and closes the extreme righthand contact to complete a circuit through the relay 45, which substitutes the balancing arrangement $M_4'$ for the balancing arrangement $M_4$ the former balancing arrangement being designed to balance the impedance of the operator's set. Having ascertained the connection desired, the plug $P_3$ will be inserted in the jack $J_3$ and the ringing key $K_4'$ operated. During this period the key $K_1'$ may be shifted to its opposite position to permit the radio operator to converse with the toll operator. When the conversation is ready to proceed, the key $K_1'$ will be again set in neutral position.

When it is desired to complete connections from station A the cord circuit $C_3$ at station B will be used as a patching cord, and as the cord circuit at station A is identical with that at station B, the operation of completing connections is the same, the only difference being that the operator observes the actuation of drops $SE_1$ and $SW_2$ instead of drops $SE_2$ and $SW_4$. The key $K_1$ when its extreme lefthand contact is closed, short circuits the connection $LE_4$ over conductors 41 to prevent singing between the radio transmitter and receiver when the hybrid coil is unbalanced. When the key is thrown to its opposite position, the extreme right-hand springs control the circuit of the relay 45 over conductor 51 in a manner similar to that described in connection with key $K_1'$. The adjustment of the gain may be controlled by means of the devices $GW_1$ and $GE_1$ the former of which is bridged across the output circuit of the amplifier $AW_4$ through the circuit $LW_3$ and the latter of which is bridged across the circuit $LE_4$ on the output side of the amplifier $AE_4$. The gain may be observed through the operator's receiver by throwing the key $K_2$ to close its lefthand springs when the gain of amplifier $AW_4$ is to be adjusted and by throwing the switch 30 to its lower position when the gain of the amplifier $AE_4$ is to be adjusted. It will, of course, be understood that when the adjustment is to be made at station A the gain adjusting devices at station B will be disconnected, and when the adjustment is to be made at station B, those at station A will be disconnected.

The circuit arrangements hereinbefore described are quite flexible and adapt themselves to a number of different methods of operations varying somewhat from those described, and as these different methods of operation will depend somewhat on the conditions under different installations, it will not be attempted here to describe all of the possibilities inherent in the apparatus as these features will be readily apparent to one skilled in the art.

It will also be obvious that the general principles herein disclosed may be embodied in many other organizations widely different from those illustrated, without departing from the spirit of the invention as defined in the following claims.

What is claimed is:

1. In a signaling system a radio transmitter and radio receiver, connections extending from said radio transmitter and said radio receiver to a common point, a hybrid coil and a balancing means for associating said connections with a two-wire terminal, a plurality of wire communication channels and a link circuit independent of said hybrid coil for associating said radio transmitter and receiver with any one of said wire communication channels.

2. In a signaling system a station having a radio transmitter thereat, a station having a radio receiver thereat, connections extending to said radio transmitter and said radio receiver, said connections having terminals at each station, a plurality of wire communication channels having terminals at one of said stations and means controllable from each station for connecting any one of said wire communication channels to said radio transmitter and receiver.

3. In a signaling system a station having a radio transmitter including a plurality of radio transmitting channels thereat, a station having a radio receiver including a plurality of corresponding radio receiving channels thereat, connections for corresponding sets of transmitting and receiving channels terminating at one of said stations, trunks for each set of channels extending between the stations, a plurality of wire communication channels terminating at the other station, means to patch the trunks at one station to the terminals of communication channels at that station, and means at the other station for variably interconnecting the trunks and the communication channels terminating at the other station.

4. In a signaling system a station having a radio transmitter including a plurality of radio transmitting channels thereat, a station having a radio receiver including a plurality of corresponding radio receiving channels thereat, connections for corresponding sets of transmitting and receiving channels terminating at one of said stations, trunks for each set of channels extending between the stations, a plurality of wire communication channels terminating at the other station, switching means at both stations adapted to variably inter-connect the trunks and communication channels at said stations, said switching means also serving as patching connections so that when variable connections between the trunks and communication channels are to be controlled from one station, the switching means at the other station may be used to patch the trunks to the communication channels at the other stations.

5. In a signaling system, a radio transmitter and radio receiver having connections leading to a common point, a plurality of wire communication channels connected to said point, link circuits each adapted to interconnect any wire communication channel with the connections leading to said radio transmitter and radio receiver by having its opposite ends connected to said wire communication channel and said radio connections, respectively, and means associated with each link circuit for enabling the operator to talk and listen on said wire communication channel exclusively or on said radio connections exclusively while maintaining both ends of said link circuit in connection with said wire channel and radio circuit, respectively.

6. In a signaling system, a radio transmitter and radio receiver having connections leading to a common point, a plurality of wire communication channels connected to said point, link circuits each adapted to interconnect any wire communication channel with the connections leading to said radio transmitter and radio receiver by having its opposite ends connected to said wire communication channel and said radio connections, respectively, means associated with each link circuit for enabling the operator to talk and listen on said wire communication channel exclusively or on said radio connections exclusively while maintaining both ends of said link circuit in connection with said wire channel and radio circuit, respectively, and means associated with said link circuits for permitting the operator to monitor the connection without interrupting it.

7. In a signaling system, a radio transmitter and radio receiver having connections leading to a common point, a plurality of wire communication channels connected to said point, link circuits each having terminal switching arrangements at opposite ends thereof, the switching arrangement at one end of the link functioning to connect said link to any one of said wire communication channels, and the switching arrangement at the other end of the link functioning to connect said link to the connections leading to said radio transmitter and radio receiver, and switching means associated with each link circuit to enable the operator's set including the transmitter and receiver to be connected over said first switching arrangements to the wire channel exclusively, or over the second switching arrangement to the radio part of the circuit exclusively, while maintaining both ends of said link circuit connected over said switching arrangements to the wire channel and the radio circuit, respectively.

8. In a signaling system, a radio transmitter and radio receiver having connections leading to a common point, a plurality of wire communication channels connected to said point, link circuits each having terminal switching arrangements at opposite ends thereof, the switching arrangement at one end of the link functioning to connect said link to any one of said wire communication channels, and the switching arrangement at the other end of the link functioning to connect said link to the connections leading to said radio transmitter and radio receiver, switching means associated with each link circuit to enable the operator's set including the transmitter and receiver to be connected over said first switching arrangements to the wire channel exclusively, or over the second switching arrangement to the radio part of the circuit exclusively, while maintaining both ends of said link circuit connected over said switching arrangements to the wire channel and the radio circuit, and means associated with said link circuits to permit the receiver of the operator's set to be associated with the connection without interrupting it.

9. In a signaling system a radio transmitter and a radio receiver, a transmission channel extending from a common point to the radio transmitter and a receiving channel extending from a common point to the radio receiver, amplifying means associated with each channel, a plurality of wire communication channels leading to said common point, link circuits for interconnecting any wire channel with said radio transmitting and receiving channels, and means whereby the operator having control of said link circuits may adjust the gain in either direction at any time.

10. In a signaling system a radio transmitter and a radio receiver, a transmission channel extending from a common point to the radio transmitter and a receiving channel extending from said common point to the radio receiver, amplifying means associated with each channel, a plurality of wire communication channels leading to said common point, link circuits for inter-connecting any wire channel with said radio transmitting and receiving channel and means whereby the operator having control of said link circuits may adjust the gain in either direction at any time and means whereby the operator may observe the effect of the gain adjustment.

11. In a signaling system, a station having a radio transmitter including a radio transmitting channel, a station having a radio receiver including a radio receiving channel, connections for said transmitting and receiving channel, terminating at one of said stations, a trunk for said set of channels extending between the stations, a plurality of wire communication channels terminating at the other station, a means to patch the trunk at one station to the terminals of said communication channels at that station, and means at the other station for variably inter-connecting the trunk and the communication channels terminating at said other station.

12. In a signaling system, a station having a radio transmitter including a radio transmitting channel, a station having a radio receiver including a radio receiving channel, connections for said set of channels terminating at one of said stations, a trunk for said set of channels extending between the stations, a plurality of wire communication channels terminating at the other station, switching means at both stations adapted to variably inter-connect the trunk and wire communication channels at said stations, said switching means also serving as a patching station so that when variable connections between the trunk and wire communication channels are to be controlled from one station, the switching means at the other station may be used to patch the trunk to the wire communication channels at the other station.

In witness whereof, I have signed my name to this specification this 28th day of May, 1926.

RALPH BOWN.

In witness whereof, I have signed my name to this specification this 2nd day of June, 1926.

EDWARD L. NELSON.